United States Patent Office 2,809,344
Patented Oct. 8, 1957

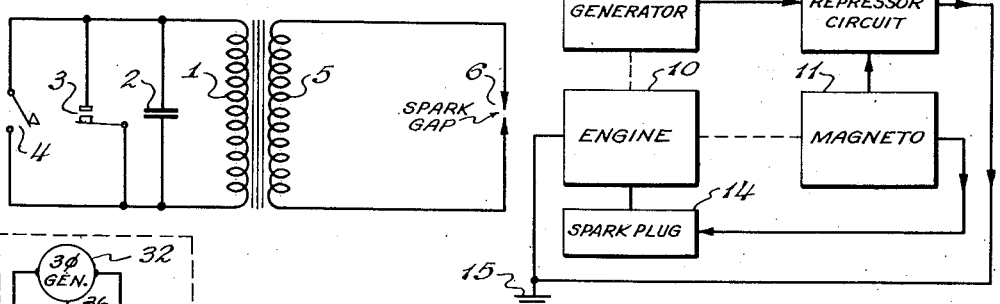
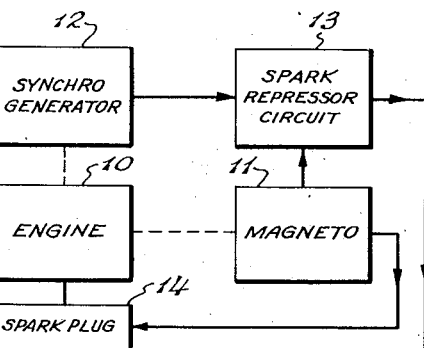
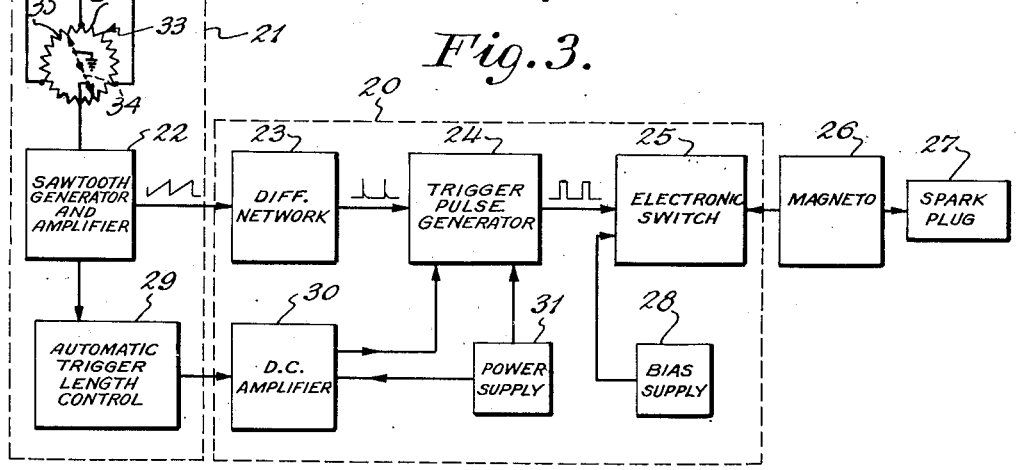
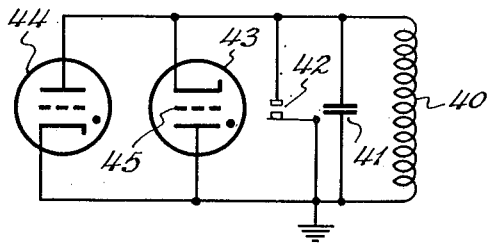
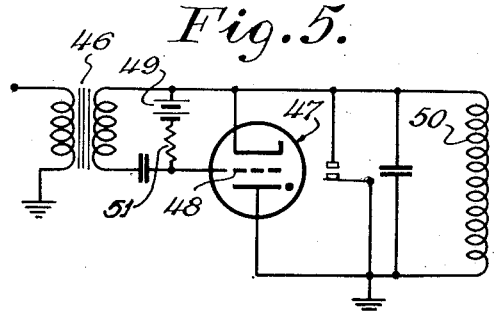
INVENTORS
ARTHUR L. MAYER
CARL M. MENGANI
BY
ATTORNEY

Fig. 6a.
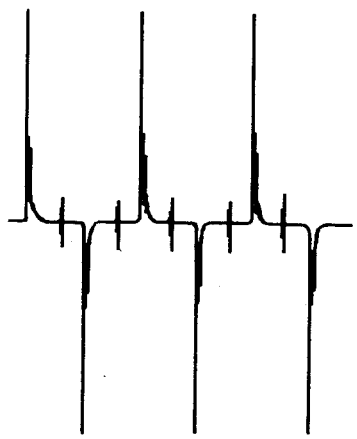
Fig. 6b.
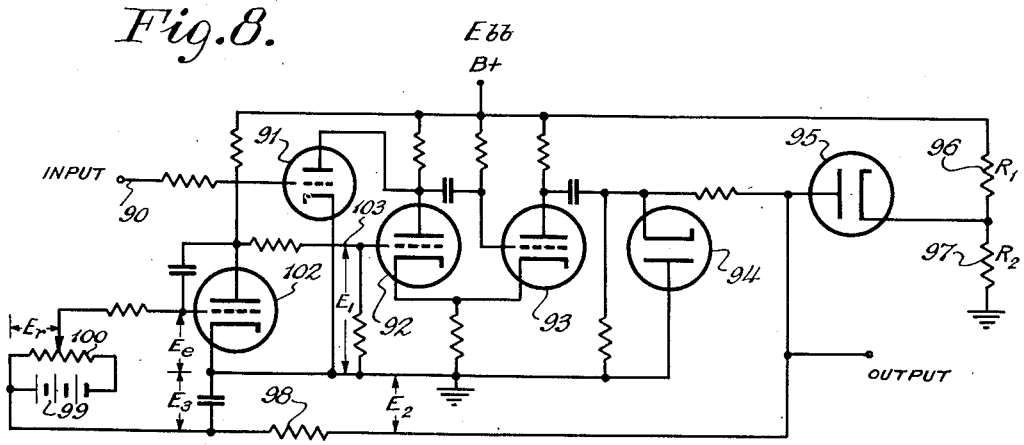
Fig. 8.
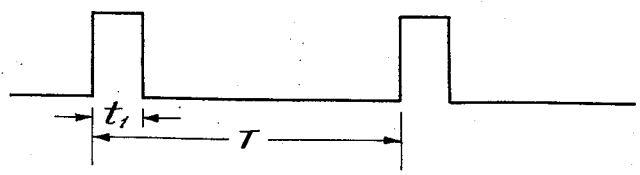
Fig. 9.
INVENTORS
ARTHUR L. MAYER
CARL M. MENGANI
BY
ATTORNEY

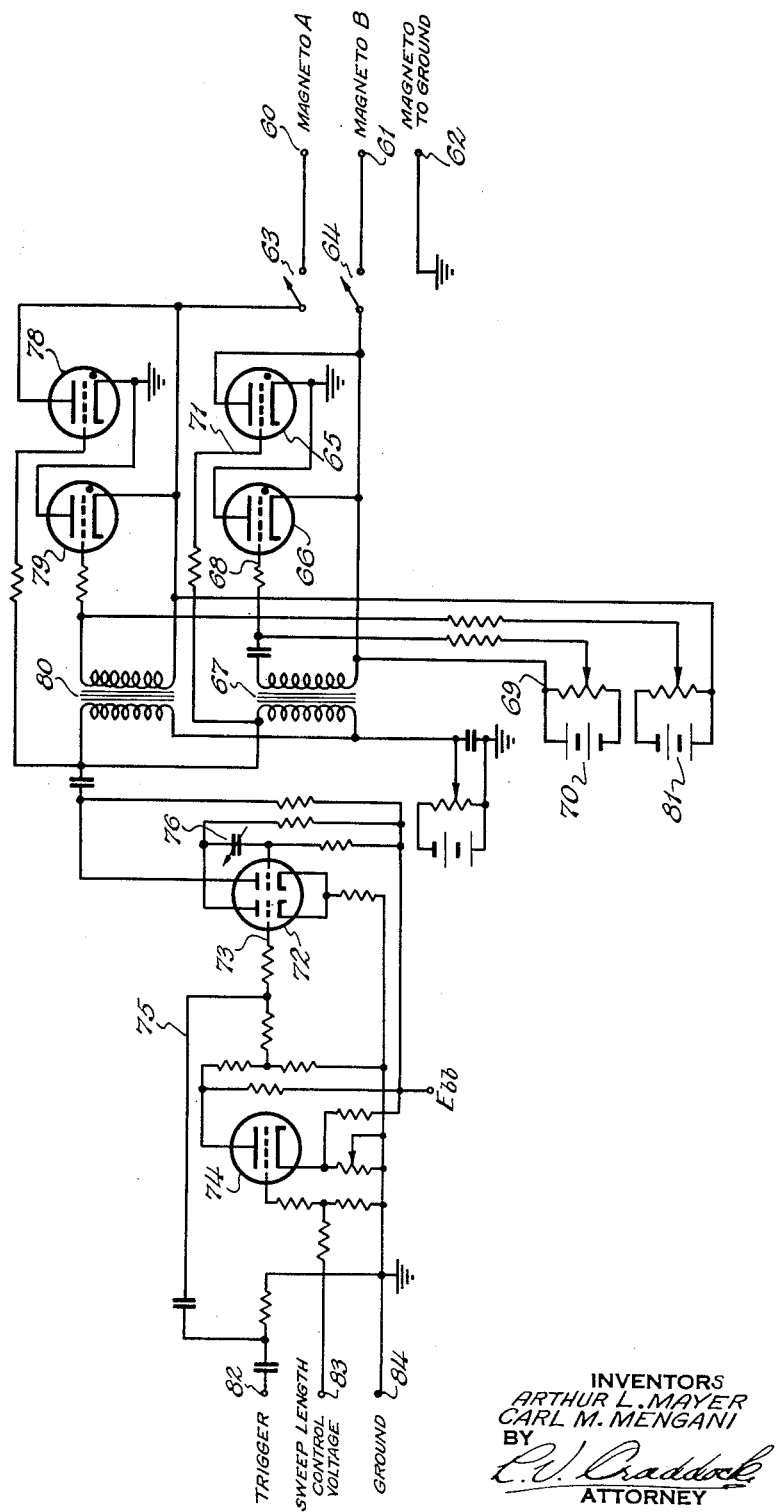

2,809,344

IGNITION REPRESSION CONTROL SYSTEM

Arthur L. Mayer, San Carlos, Calif., and Carl M. Mengani, Glen Oaks, N. Y., assignors to Sperry Rand Corporation, a corporation of Delaware Application November 12, 1953, Serial No. 391,416

16 Claims. (Cl. 324—19)

This invention pertains to engine testing systems. More particularly, it is a system which affords the testing of an internal combustion engine by repressing the ignition spark to a selected cylinder and observing the change in performance resulting therefrom.

It is well known in the prior art and in engine testing practices that if one cylinder of an engine is purposely disabled, the contributory performance of that cylinder under normal operating conditions may be evaluated from the resulting loss of engine speed, torque, engine power, etc. The extent of significant information which can be gained about the operation of one or more cylinders by employing such a method depends to a large extent upon the type, amount, and reliability of statistical data available pertaining to engine performance and its interpretation in comparison with the observed performance of the particular engine undergoing test.

The present invention is concerned with selectively disabling one cylinder of a multi-cylinder internal combustion engine by positively repressing the ignition spark to that selected cylinder. This is accomplished with particular regard to the twin magneto and multi-magneto ignition systems such as are employed in aviation engines. Apparatus in accordance with the present invention represses the ignition spark to the selected cylinder for a period of time stabilized in proportion to the period between ignition pulses in successively fired cylinders of the engine under test.

A primary object of the invention, therefore, is to afford synchronous disabling of a selected cylinder in a multi-cylinder engine through the periodic positive repression of ignition spark to that cylinder during each engine cycle for a period of time inversely proportional to the speed of the engine.

A further primary object of the invention is to maintain spark repression to the selected cylinder for a period sufficiently long as to prevent spurious firing of that cylinder and synchronously to terminate such controlled repression.

Another object of the invention is to prevent the spark repression to any but the selected cylinder.

Still another object of the invention is to cyclically repress the spark to a selected cylinder of an engine having multi-magneto ignition without interference with the ignition to the remaining cylinders other than that selected to be tested.

These and other features of the invention will be more evident from an understanding of the following description in conjunction with the drawings in which:

Fig. 1 is a schematic representation of a spark repression system;

Fig. 2 is a block diagram of an embodiment of the ignition repression control system of the present invention;

Fig. 3 is a block diagram of an embodiment of the present invention used in conjunction with an engine analyzer;

Fig. 4 is a schematic diagram of an electronic switch spark repression system;

Fig. 5 is a schematic diagram illustrating the grid coupling employed in a preferred embodiment of the present invention;

Fig. 6A is a graphic illustration of the cathode ray tube display produced by a typical aviation engine high tension ignition system;

Fig. 6B is a graphic illustration of the cathode ray tube display produced by a typical aviation engine low tension ignition system;

Fig. 7 is a schematic diagram of preferred embodiment of the present invention;

Fig. 8 is a schematic diagram of an automatic pulse stabilization circuit as it is employed in another preferred embodiment of the present invention;

Fig. 9 is a graphic illustration of the type of rectangular control pulse produced by the spark repressor system of the present invention.

It has been the practice in testing internal combustion engines of multi-cylinder type, to purposely disable a selected cylinder and ascertain from the resulting difference in performance with what degree of efficiency that selected cylinder had normally operated before being disabled. A comparison of the manner of the over-all operation of the engine before and after the selected cylinder was disabled is the indication which is relied upon to evaluate the operative performance of the selected cylinder. By successively disabling each of the cylinders of a multi-cylinder engine, the results in each case can be compared with the other cylinders of the same engine and other engines of like type to afford a standard or an index with which to evaluate the performance of any one particular cylinder.

While in the early days of use of the internal combustion engine in the automobile industry, the spark repression method of disabling a selected cylinder was generally employed principally as a test of the ignition spark within that cylinder, the spark repression test need not be so limited. Rather, the limiting factors in such a test are the validity and amount of statistical data with which one is supplied and from which a conclusion is to be drawn with respect to the performance of a particular cylinder of an engine undergoing test. The statistical data should, of course, be compiled with respect to the type of engine being tested and should include reliable interpretations of the type of normal reaction one may expect to spark repression when applied to a particular cylinder. The types of reactions one may expect for various types of malfunctions within the cylinder undergoing test, and the significance of the degree of the reaction to spark repression thus observed should be carefully and accurately categorized.

The present invention comprises a system for positively repressing the ignition spark to a selected cylinder for a precisely controlled duration of time in accordance with the R. P. M. of the engine undergoing test, to more reliably indicate the reaction of that particular cylinder to the spark repression and thereby render the observed reaction more significant in the light of available statistical data.

A simplified schematic diagram of the general method of spark repression as employed in the prior art is shown in Fig. 1. Coils 1 and 5 may be considered as the primary and secondary windings respectively of a magneto. A spark gap 6 is indicated as being connected across the secondary winding 5. A set of breaker points 3 is connected in parallel with the primary winding 1 and upon the actuation of the breaker points 3 through mechanical linkage with the engine, current flows through the primary winding 1 when the breaker points 3 are closed, and ceases to flow through the primary winding 1 when the breaker points are open. A condenser 2 is placed in parallel with the breaker points 3 and the primary winding 1 to minimize sparking across the breaker points 3 as they open.

A switch 4 is schematically shown as being connected in parallel with the breaker points 3, condenser 2, and primary winding 1. It can be seen that when the switch 4 is closed, no change in the flow of current through the primary winding 1 will take place regardless of the continuous opening and closing of the breaker points 3. Consequently, no voltage is induced in the secondary winding 5 of the magneto coil with the result that no potential bridges the gap 6 to cause a spark within the combustion chamber of that cylinder. This then suppresses the ignition to the engine normally supplied by the magneto by means of substantially short circuiting the primary winding of the magneto. If a switch such as that shown at 4 in Fig. 1 is closed for an appropriate duration of time synchronously with the firing of a particular selected cylinder, the spark to that cylinder will be repressed and none other. In prior art devices such as that disclosed in the U. S. Reissue Patent 23,150 issued to R. L. Sexton, September 20, 1949, the switch 4 was a set of contact points very much like the breaker points 3. An obvious equivalent of such a switch is an electronic switch such as a gas-filled electronic tube of the thyratron type. This type of tube is well suited to spark repression schemes because of the fact that it has virtually no impedance when conducting and may be readily regulated in its conduction by the application of bias to its grid or control electrode.

Prior art schemes have utilized switch means such as that disclosed in the Sexton Reissue Patent No. 23,150, connectably disposed to be placed across the primary side of the spark ignition source normally maintained in a non-conducting condition. Synchronous momentary conduction through the switch as the magneto was about to generate a spark for the cylinder selected to be tested, repressed the spark to that cylinder. In this manner, normal operation of that particular cylinder was prevented and the changes in engine operation resulting therefrom observed and compared to appropriate statistical data.

If an electronic switch such as a gas-filled electron discharge tube were to be substituted for the contact point switch, the obvious manner of effecting conduction analogous to that of the contact points would be to connect the gas-filled tubes, such as thyratrons, back-to-back as shown in Fig. 4. This method of effecting repression of the ignition spark, however, has its shortcomings. Assume that the synchronous signal which is utilized to fire the thyratrons is a sharply peaked pulse of comparatively short duration. Though this type of pulse is reasonably well suited to initiate conduction through the thyratron spark repressor switch tubes, the conduction through the tubes would not take place throughout a controlled period of time, i. e., conduction for substantially the same duration of time would result from the use of this synchronous signal, though the speed of the engine varied widely. Conversely the ionization of the gas within the thyratron or similar type tube under varying ambient conditions may easily be such that would cause different conduction periods in response to a consistent type of synchronous actuating pulse produced by an engine operating at constant speed. These conditions are most undesirable for accurate and precise testing purposes.

Internal combustion engines generally generate ignition potentials by some type of breaker point arrangement. These breaker points are mechanically linked to an engine-driven device which opens them. When not opened, the breaker points normally remain closed so that the period of time during which the breaker points are open or closed varies as a function of engine speed. For this reason the duration of the period during which the switch of a cylinder disabling device provides an alternate current path paralleling the breaker points, should be controlled as a function of engine speed. The initiation and termination of conduction through the switch must be carefully synchronized with engine operation and it is preferable that the conduction period be automatically controlled as to duration.

Thus, the present invention is directed toward the solution of these problems in providing a spark repression system which, though utilizing either mechanical or electronic switch means to effect disabling of a selected cylinder as was done in the prior art, has the added improvement which will cause the switch means to cyclically repress the ignition spark to a selected cylinder for a duration of time as a function of the R. P. M. of the engine undergoing test, and proportioned to the period between the firing of successive cylinders of the engine, which spark repression period is determined by controllable initiation and termination points synchronized with engine operation.

Fig. 2 shows a simplified block diagram of one embodiment of the present invention arranged to operate in conjunction with an internal combustion engine 10 which mechanically drives a magneto 11 to generate ignition potential for its cylinders. The magneto 11 is shown as being electrically connected to a single spark plug 14, though, of course, the spark plugs in an aviation type internal combustion engine could be shown as a multiplicity of circuits paralleling that of the one spark plug circuit schematically illustrated in Fig. 2. For purposes of illustration, only one spark plug is shown in the interests of simplicity and clarification. A synchronous generator 12 is also shown as being mechanically driven by the engine 10. A spark repressor circuit 13 is connected to receive both the primary voltage of the magneto 11 and the output pulse of the synchro generator 12. The spark repressor circuit 13, it will be noted, is interposed between the magneto 11 and engine ground 15 in a circuit paralleling that of the spark plug 14. This engine driven system operates so that both the synchro generator 12 and the magneto 11 generate signals synchronized with the mechanical R. P. M. of the engine 10. The spark repressor circuit 13 is non-conducting in its quiescent state state so that voltages are generated at the secondary winding of the magneto 11 and these latter voltages bridge the gap of the engine spark plugs in firing order through a distributor device. Each of the potentials thus generated traverses a path similar to that provided through spark plug 14 and through the engine 10 to ground. However, each time a pulse is generated by synchro generator 12 coincidentally with the normal firing time of the cylinder selected to be disabled, the spark repressor circuit 13 is actuated. This circuit is connected to the primary winding of magneto 11 and effectively short circuits that primary winding by causing conduction through thyratrons connected across it. The duration of such conduction is preferably apportioned, for instance, to the mechanical speed of the engine undergoing test. Thus, no spark is produced at the spark plug of the cylinder which normally fires during that period when the spark repressor circuit is conducting.

Fig. 3 illustrates the employment of a spark repressor circuit 20 schematically represented in accordance with the present invention and connected to an engine analyzer. A three-phase A. C. generator 32 has its output imposed on a selector switch 33 of the type shown and described, for example, in an article entitled "Airborne engine analyzer," by V. C. Cetrone in the March 1948 edition of Electronics magazine. The selector switch taps a one phase signal which is fed to a sawtooth generator 22. The phase of the signal fed to generator 22 is dependent upon the angular position of two synchronously rotatable contact arms 34—35, each having a point of engagement with a continuous circular resistor 36 of switch 33. The contact arms 34—35 are insulated from each other and attached to a shaft equipped with a detent mechanism, not shown, so arranged that as the shaft is rotated by means of a knob, not shown, the contact arms 34—35 are moved around the circular resistor 36 in discrete steps. A dial, not shown, used in connection with the knob is inscribed with numbers spaced over the 360-degree travel of the knob, one number for each cylinder of the engine being tested. The numbers of the cylinders appear around the dial in the sequence of the particular engine's firing order. By turning the knob from one cylinder number to the next, the phase angle of the one phase signal at the output of switch 33 is shifted with respect to the angular position of the engine crankshaft by an amount equal to the number of crankshaft degrees between the occurrence of an event in one cylinder and the occurrence of the same event in the next cylinder. Thus, the signal at the output of switch 33 can be made to have a particular phase which is related to a particular point in an engine cycle, the frequency thereof being a function of engine speed.

The spark repressor circuit 20 in this embodiment is connected to receive the sawtooth signal from the engine analyzer in the form illustrated. The differentiating network 23 transforms the received sawtooth waveform into a series of sharp pulses which periodically actuate the electronic switch trigger pulse generator 24. The latter circuit is a rectangular pulse generator and feeds the electronic switch 25 (which in this instance takes the form of a thyratron circuit) with a rectangular pulse of appropriate amplitude and controllable duration. The switch 25 is connected to the magneto 26 in a manner previously outlined in connection with the explanation of Fig. 2. The magneto is, of course, in turn connected to a secondary winding which periodically furnishes its high potential to each of the spark plugs of the engine, one of which is represented at 27 in Fig. 3. Engine analyzers such as the portable and airborne instruments commercially available for aircraft engine analyzation include an automatic sweep length control circuit as is schematically shown at 29 in Fig. 3. This particular circuit produces a signal which varies inversely as the mechanical speed of the engine undergoing test and the details of its operation are disclosed in the pending application S. N. 269,301, filed January 31, 1952, and assigned to the assignee of the invention herein, now U. S. Patent No. 2,753,451, issued July 3, 1956. The proportioned output of automatic sweep length control 29 is received by a D. C. amplifier 30 and its output is fed to the trigger pulse generator 24 as the D. C. potential for controlling its bias. The duration of the rectangular pulse produced by the trigger pulse generator 24 is thus inversely proportioned to the frequency of such pulses. The detailed operation of each of the components of the spark repressor circuit will be explained more fully hereinafter in connection with the description of the circuits of Fig. 7.

Because of the fact that aircraft ignition systems generally do not operate on only one polarity of D. C. voltage, an electronic switch circuit such as that shown in 25 of Fig. 3 is usually comprised of two electron discharge tubes oppositely polarized and connected back-to-back as shown in Fig. 4. The primary winding 40 of the magneto is paralleled by a condenser 41 and breaker points 42 much in the manner of the basic prior art circuit previously described in connection with Fig. 1. It will be noted that the tubes 43 and 44, which comprise an electronic switch for voltages of either polarity, are connected in parallel across the primary winding 40 of the magneto. Tube 43 is shown as having its plate grounded. The grid or control electrode 45 of tube 43 could be biased to a suitable degree and returned to ground through an appropriate resistance. Because the magneto potential may be either positive or negative with respect to ground, the two thyratrons are necessary for spark repressing purposes. Thyratron 44 connected with its cathode grounded, will repress positive magneto signals and the other thyratron 43 with its plate grounded, will repress negative signals. When the magneto potential output is negative, the grid 45 of plate grounded thyratron 43, if returned to ground, will have positive bias with respect to the cathode and conduction will occur in thyratron 43 without a trigger. Application of a very large negative bias to overcome the positive magneto bias on thyratron 43 is impractical in most cases because of the large magnitude of variations between different magnetos and different ignition systems, i. e., a bias sufficiently large and appropriate to use with one system may be entirely insufficient for proper operation of the circuit with another system.

However, the difficulty may be avoided by returning the grid to the cathode instead of to ground. In order to accomplish this, the plate grounded thyratron must be isolated from the pulse generator. Fig. 5 shows an arrangement where the grid 48 of plate grounded thyratron 47 is coupled through transformer 46 to the pulse generator and is returned to the primary winding 50 of the magneto. An appropriate source of bias such as that shown by the battery 49 may be applied between the grid input and the transformer winding to maintain the thyratron 47 normally beyond cutoff. A resistor 51 prevents loading of the secondary winding of transformer 46.

The necessity for having dual polarity electronic switch means is more evident when reference is made to the illustrations of Figs. 6A and 6B. These latter display the high tension and low tension types of ignition systems respectively as characterized by their cathode ray tube displays. It will be noted that the low tension ignition system characteristic as shown in Fig. 6B has successive cylinders firing on potential of opposite polarities. By contrast the high tension ignition system characteristic as shown in Fig. 6A has successive cylinders firing on potentials of both polarities though in the latter case one polarity signal dominates over the other. However, in either case, whether the high tension or the low tension system which are normally encountered in modern internal combustion piston driven aircraft engines, there are within both types of signals components of both polarities of sufficient amplitude to cause spurious firing of the electronic switch means of a spark repression device if such switch means is not very carefully controlled.

The schematic wiring diagram of Fig. 7 illustrates the details of a spark repressor circuit in a preferred embodiment of the present invention. Two terminals 60 and 61 are arranged to be connected to the two magnetos of a dual magneto ignition system such as may be found on many aircraft engines. Ancillary means may be provided to afford use of the spark repressor with engines employing as many as seven twin magnetos such as are used in some twenty-eight cylinder engines, for instance. If a multi-magneto engine is being tested such as a twenty-eight cylinder engine, a relay box may be employed to facilitate synchronous spark repression in the correct magneto. A plurality of relays are used, one being connected from each magneto to the spark repression circuit through the magneto terminals of Fig. 7. A trigger similar to that which synchronously actuates the rectangular pulse generator is supplied to the relay box through a selector device and closes the correct relay to afford repression of the ignition potential in accordance with the selected trigger. The selection of the proper trigger may be accomplished through use of the cycle switch and magneto relay circuits of a portable or airborne engine analyzer which are ideally suited to this use. A separate unit may be employed to this end, however, if desired.

For purposes of explanation of the operation of the spark repressor circuit of Fig. 7 it will be assumed that the simpler dual magneto engine is being tested and has its magnetos properly connected to input terminals 60 and 61. A third terminal 62 affords a ground connection to insure that the spark repressor circuit and the magnetos are at exactly the same ground potential. Two switches 63 and 64 are connected in series between the input terminals 60 and 61 respectively and the spark repressing means which parallels the circuit of the magneto to spark plug ground. By means of switches 63 and 64, either one or both of the magneto ignition potentials may be selected to be repressed. These switches are connected to feed their respective inputs, when closed, to the plate-cathode circuits of oppositely poled electronic switch means connected back-to-back as are the pairs of electron discharge tubes 65 and 66, and 78 and 79. These tubes may be of a gas-filled type and in one preferred embodiment of the present invention C3J thyratrons were found to be suited to this use.

Thus the magneto or magnetos which it is desired to disable are selected through the positioning of switches 63 and 64, connecting the potential of the primary windings of the magneto so selected across the thyratron plate-cathode circuit. However, when there is conduction through the primary winding of a magneto so connected, neither of the thyratrons conduct because they are normally biased to prevent such conduction. Batteries 70 and 81 furnish bias to the grids of tubes 79 and 66 to assure this mode of operation. A potentiometer such as that shown at 69 is connected across the source of bias supply for each tube and a variable tap provides means of adjusting the operative point where conduction will begin to take place in each tube.

In order to have the thyratrons conduct and thus repress the magneto potential to a selected cylinder at the proper time, a synchronous trigger must be applied to the thyratrons. This trigger is obtained from any appropriate engine-driven means such as an engine-driven switch or a synchronous generator. The trigger, corresponding in time displacement within the engine cycle to the firing of a particular cylinder, is fed to the spark repressor circuit through terminal 82. It is then capacitively coupled through a connection 75 to the grid 73 of a rectangular pulse generator tube 72. This latter mentioned generator may be a multi-vibrator type as is shown in Fig. 8.

The trigger pulse synchronously actuates the multivibrator 72 which in turn produces a rectangular pulse of duration dependent upon its time constant. The time constant may be changed by adjustment of a variable capacitor 76 in the plate-grid circuit of the multivibrator. As an alternative, a multiple contact switch connectably disposed to contact one or more of a plurality of capacitors may be employed to vary the time constant of the multivibrator and thereby adjust the duration of the period during which spark repression takes place to conform to the operational characteristics of various engines and ignition systems.

The rectangular pulse produced by the multivibrator 72 is inductively coupled to thyratrons 66 and 79 and capacitively coupled to thyratrons 65 and 78. This pulse causes those thyratrons having the correct voltage across their plate-cathode circuit to conduct for the period of the pulse and then revert to the quiescent non-conducting state at the end of the pulse. Those thyratrons which may not be connected to a magneto or which have an inverse potential across their plate-cathode circuit at the time that the rectangular pulse is fed to the grid, do not conduct. The thyratron conduction disables the magneto to which the thyratron is connected because it offers to the magneto primary current a path to ground having virtually no impedance for practical purposes.

It is important to note that the rectangular pulse output of the multivibrator not only initiates conduction through the thyratron synchronously but also maintains that conduction for a determinable period of time. The length of the rectangular pulse is substantially controlled by the bias on the input electrode of the multivibrator and the time constant of the multivibrator. Assuming that the time constant is adjusted and will remain constant throughout the test of a particular engine, the bias of the multivibrator may be varied in accordance with the speed of the engine to automatically adjust the length of the rectangular thyratron trigger pulse and thereby conform the period of conduction to engine speed changes and breaker point dwell time so as to preclude spurious firing of the cylinder selected to be disabled at any particular time.

Such a bias control voltage may be obtained from the sweep length control voltage of an engine analyzer embodying the invention disclosed in the aforementioned U. S. Patent No. 2,753,451, if such an instrument is used in conjunction with the spark repression test procedure. This type of control voltage, which varies in response to engine speed, is shown as being connected to input terminal 83 of the spark repressor circuit. Other means of automatically adjusting the multivibrator bias may be used as will appear later in connection with the explanation of the operation of the apparatus of Fig. 8.

From the input terminal 83, the sweep length control voltage (or an appropriate portion of it) is fed to the control electrode of a D. C. amplifier 74, the output of which is fed to the input electrode 73 of the rectangular pulse generating multivibrator 72. This D. C. bias control voltage determines the length or duration of the rectangular pulse which actuates the electronic switch to periodically disable the magneto primary winding. In this particular embodiment the rectangular pulses fire thyratrons, but it is apparent that other switch means may be employed with similar control pulses.

The breaker points of the engine ignition system are actuated by mechanical linkage to the engine. Thus the time during which the breaker points are closed (usually termed "dwell") varies in inverse proportion to the speed of the engine. If then a pulse of constant duration were synchronously applied to the disabling electronic switch, there is the possibility and even the likelihood that the pulse will be insufficient to completely prevent ignition in the selected cylinder throughout its normal power stroke, for all speeds of test operation.

This may be better understood by reference to Figs. 6A and 6B. Assuming that the ignition patterns shown are for an intermediate speed, if the same time base is retained and the engine operated at a higher speed, the ignition pattern will appear to be proportionally compressed. It follows that the period between ignition pulses generated by the magneto becomes smaller as the speed increases. At a high speed, a fairly short duration of pulse, perhaps even a sharply peaked pulse, might well be of sufficient duration to repress the spark to a selected cylinder throughout its power stroke. But as the engine is slowed down in R. P. M., the period between successive ignition generations will increase. From maximum speed to normal idle, the speed ratio may be as much as 3 to 1, or more. Thus it can readily be appreciated that the smaller spurious potentials which occur between main ignition potentials, as shown in Figs. 6A and 6B, will be more removed in time from the main ignition potentials as the speed of the engine becomes slower. Some of the smaller spurious potentials are sufficient to fire a cylinder and therefore both the main ignition potential and the smaller spurious potentials occurring during the power stroke period of the selected cylinder must be repressed to preclude unwanted firing of the cylinder if the engine test is to be reliably significant. This circumstance requires that the spark repression device repress the ignition to a selected cylinder for a period of time inversely proportional to the speed of the engine and it is one of the fundamental concepts of the present invention to so provide.

Another way in which this requisite may be expressed is that the spark must be repressed to the selected cylinder for a period of time having a stabilized proportionality in relation to the period between successive main ignition potentials. This proportion is graphically expressed in Fig. 9 where T is the time between successive main ignition potentials and $t_1$ is the duration of the rectangular pulse which controls the spark repressing switch. Reference to Figs. 6A and 6B will indicate the proportionality of $t_1$ to T required for each of the different ignition systems whose cathode ray tube patterns are illustrated.

If the spark repressor is not employed in conjunction with an engine analyzer equipped to furnish a source of bias varied in response to engine speed, another means of controlling the length of the rectangular pulse must be relied upon. One such scheme is illustrated schematically in Fig. 8. In this apparatus the synchronous input pulses are received at an input terminal 90 and fed to an amplifier 91. From there the pulses are received at the plate-grid interconnection of a multivibrator comprised of electron tubes 92 and 93. Rectangular pulses of the general configuration of those discussed hereinbefore are produced by the multivibrator and negatively and positively clipped by diodes 94 and 95. One clipper 95 has its cathode positively biased by an amount proportional to the ratio of two potential-divider resistors 96 and 97, connected in series between the source of B+ potential and ground. The clipped rectangular wave is smoothed and filtered by an RC filter 98 and fed to a variable resistor 100. The resistor 100 is across a source of reference potential such as that provided by a battery 99. The amplitude of tapped reference potential is thus compared to the average value of the rectangular wave. The duration of the rectangular pulse, of course, determines the average amplitude of the waveform with respect to time because the wave is clipped so that the amplitude of the rectangular wave is constant and not subject to change with changes in other circuit parameters. The difference between the average amplitude of the rectangular wave and the reference potential is received by the grid of a D. C. amplifier 102, the output of which is applied to the grid 103 of the multivibrator tube 92 to control the length of rectangular pulse produced by the pulse generator comprising tubes 92 and 93.

Assuming that $t_1$ and T are related as indicated in Fig. 9, the operation of this circuit may be analyzed as follows:

$$\max. E_2(t) = (E_{bb})\left[\frac{R_2}{R_1+R_2}\right]$$

and $$t_1 = K_1 E_1$$

$$T = \frac{1}{f}$$

where $f$=frequency of trigger; therefore $$\frac{t_1}{T} = K_1 E_1 f$$

Integrating $E_2$, $$E_3 = K_3 \frac{t_1}{T} = K E_1 f$$

where $$K_3 = (E_{bb})\left[\frac{R_2}{R_1+R_2}\right]$$

and $$K = K_1 K_3$$

$$E_e = E_3 - E_r = K E_1 f - E_r$$

$$E_1 = (K_5 - A E_e) = K_5 - A K E_1 f + A E_r$$

where $$K_5 = E_1 \text{ for } E_e = 0$$

$$E_1(1+AKf) = K_5 + AE_r$$

$$E_1 = \frac{K_5 + AE_r}{1+AKf}$$

if the gain (A) is large, this reduces to $$E_1 = \frac{E_r}{Kf}$$

and $$E_3 \cong \frac{E_r Kf}{Kf} \cong E_r$$

$$K = K_1 K_3 = K_1(E_{bb})\left[\frac{R_2}{R_1+R_2}\right]$$

for $t_1 = 0.01$ secs. and $E_1 \cong 20$ volts $$K_1 = \frac{0.01}{20} = 5 \times 10^{-4}$$

let $K_3 = 100$ volts then $K = 0.05$ and $Kf = 0.5$ where $f = 10$ cycles/sec.

Therefore, A should be greater than 20 for satisfactory operation producing a stabilized pulse proportionality as related to trigger period for trigger frequencies of from 8 to 24 cycles/second.

Whether the particular form of pulse proportion stabilization circuit illustrated in Fig. 8 is used or not, however, it is evident that the novel concept of the present invention and its execution in commercially practical apparatus adds greatly to the reliability and significance of test results employing cylinder disabling procedures. Moreover, the vastly improved precision and accuracy of such cylinder disabling test procedures which results from the use of the present invention opens wholly new and undeveloped approaches to the compilation of statistical data which are the foundation of much of the cylinder disabling test procedure and the conclusions to be inferred therefrom.

The flexibility and versatility of this invention also is a worth-while recommendation for its use, for it may be equally well employed with widely different types of engines and ignition systems and is readily adaptable to use in conjunction with a variety of auxiliary apparatus, both portable and airborne.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus adapted to be connected to an engine for cyclically repressing the ignition spark to a cylinder for a controlled period, comprising switch means having first and second operating states for blocking and for passing current flow therethrough, respectively, a circuit for coupling an engine ignition through said switch means to ground for one of said operating states of said switch means, rectangular pulse wave generator means coupled to said switch means for supplying a series of recurrent pulse waves thereto for recurrently initiating and terminating current flow through said switch means for predetermined periods of time, and actuation means coupled to said generator means for regulating the repetition time of the pulse waves provided thereby as a function of the cycle of the engine to which said apparatus is to be connected, said actuation means including means for controlling the time-phase of said recurrent pulse waves relative to said engine cycle.

2. Apparatus in accordance with claim 1 wherein said actuation means includes an alternating current three-phase engine driven generator, means coupled to said generator for selecting therefrom a single-phase signal whose phase corresponds to any point of the engine cycle, and means coupled to said last-named means for actuating said pulse wave generator means in response to said selected signal.

3. Apparatus in accordance with claim 1 wherein said pulse wave generator means comprises a monostable oscillator including a gating circuit coupled to said actuation means.

4. Apparatus in accordance with claim 1 wherein said control means includes a monostable multivibrator circuit adapted to produce a rectangular pulse wave of duration dependent upon the time constant of said circuit.

5. Apparatus in accordance with claim 1 wherein said generator means includes a rectangular pulse wave generator having a preselected RC network coupled thereto for regulating the duration of the pulse waves produced by said generator.

6. Apparatus in accordance with claim 1 wherein said generator means includes a rectangular pulse wave generator having a variable RC network connected thereto for controlling the duration of the pulses produced by said generator.

7. Apparatus adapted to be connected to an engine for testing by cyclically repressing the ignition spark to a cylinder for a controlled period, comprising rectangular pulse generator means for providing a recurrent pulse wave output, a pair of electron discharge means connected back-to-back, each of said means having an anode, a cathode, and a control grid, the anode of one of said discharge means and the cathode of the other of said discharge means being connected to receive an ignition potential of an engine undergoing test, the grids of both of said discharge means being reactively coupled to the output of said rectangular pulse generator means to initiate and terminate current flow through said electron discharge means in response to the magnitude of the pulse wave therefrom for first and second periods of time, respectively, and means coupled to said pulse generator means for causing the repetition rate of said recurrent pulse wave output to be a function of the cycle of the engine undergoing test.

8. Apparatus for testing a dual ignition engine by repressing the ignition in a selected cylinder, comprising rectangular pulse generator means, a first pair of electron discharge means connected back-to-back, each of said means having an anode, a cathode, and a control grid, the anode of one of said first pair of discharge means and the cathode of the other of said first pair of discharge means being connected to receive the primary ignition potential of one source of said dual ignition, the grids of one and the other of said first pair of discharge means being coupled to receive the output of said rectangular pulse generator means, a second pair of electron discharge means connected in like manner to said pulse generator means and to the other source of said dual ignition, the output of said generator means being adapted to selectively initiate and terminate current flow through either of said pairs of electron discharge means, and engine driven means coupled to said generating means for triggering thereof at any selected point of the engine cycle at a repetition rate which is a function of the engine cycle.

9. A rectangular pulse wave generator control means, including a monostable multivibrator adapted to generate a rectangular pulse wave, means to clip the negative and positive portions of said rectangular pulse wave to a predetermined amplitude, a condenser connected to receive a charge proportional to the frequency of recurrence of said rectangular pulse wave, a known reference voltage source, means to compare the amplitude of said condenser charge with said reference voltage, and means to bias said multivibrator in proportion to the difference voltage output of said comparison means, whereby the duration of said rectangular pulse wave is proportional to the frequency period of recurrence thereof.

10. A rectangular pulse wave generator control means, including a monostable multivibrator adapted to generate a rectangular pulse wave, oppositely poled diodes connected to receive said generated rectangular pulse wave and clip its amplitude in accordance with the bias of said diodes, means to integrate said clipped rectangular pulse wave, a source of reference voltage, means to compare the amplitude of said integrated pulse wave with said reference voltage, and means to bias said multivibrator in proportion to the difference voltage output of said comparison means, whereby the duration of said rectangular pulse wave is dependent upon the frequency of recurrence thereof.

11. Electronic switching apparatus, comprising monostable pulse generator means having quasi-stable and stable operating states and timing means for controlling the duration of said quasi-stable state, means coupled to said generator means for recurrently driving said generator means into its quasi-stable operating state whereby a recurrent pulse output is provided by said generator means for each operation in a quasi-stable state, electron discharge tube switch means having first and second operating conditions for respectively providing high and low impedances between a pair of terminals, means coupled to said switch means for control thereof in one of its operating conditions, means coupling said generator means to said switch means for control of said switch means in the other of its operating conditions during a pulse from said generator means, and means coupled to said timing means for regulating the time duration of said quasi-stable state as an inverse function of the rate at which said generator means is recurrently driven into said quasi-stable state.

12. Electronic switching apparatus as set forth in claim 11, including means for generating a D.-C. voltage whose magnitude is a function of the rate of recurrence of the pulses provided by said pulse generator means, said pulse generator means including a grid-controlled discharge device and an RC timing circuit with the grid of said discharge device being coupled to said D.-C. voltage generating means, the duration of the quasi-stable state of said generator means being a function of the time constant of said timing circuit and the D.-C. voltage at the grid of said discharge device.

13. Electronic switching apparatus as set forth in claim 12, wherein said D.-C. voltage generating means includes means coupled to said pulse generator means for clipping the recurrent pulse output provided thereby, a condenser coupled to said clipping means for charging as a function of the repetition rate of the pulses provided by said pulse generator means, a D.-C. amplifier having an input coupled to said condenser for providing a voltage output functionally related to the charge of said condenser, and means coupling the output of said D.-C. amplifier to the grid of said grid-controlled discharge device.

14. Electronic switching apparatus, comprising generator means for providing a series of recurrent pulses, said generator means being adjustable for changing the repetition time, the phase and the time duration of the pulses provided thereby, electronic switch means, said switch means having a conducting operating state and non-conducting operating state, a pair of terminals, means coupling said switch means between said terminals for regulating the impedance thereacross in accordance with the operating state of said switch means, said switch means being coupled to said generator means for receiving the series of pulses therefrom for driving said switch means into its conducting state during each recurrent pulse, and means coupled to said generator means for automatically regulating the width of the pulses provided thereby as an inverse function of the repetition rate of the pulses provided by said generator means.

15. Electronic switching apparatus for an engine magneto, comprising first and second grid-controlled thyratrons, the plate of one and the cathode of the other of said thyratrons being grounded, the cathode of said one and the plate of said other of said thyratrons being coupled to a common terminal for connection to a high voltage terminal of a magneto winding, a coupling capacitor connected in series with the grid of the other of said thyratrons for supplying a recurrent triggering voltage wave thereto, a D.-C. isolating capacitor having first and second terminals, the second terminal of said D.-C. isolating capacitor being connected to ground, a transformer having a primary winding connected between the grid of said other thyratrons and said first terminal of the D.-C. isolating capacitor, a secondary winding connected between the grid of said one of said thyratrons and said common voltage terminal, means connected to opposite sides of said D.-C. isolating capacitor for supplying the grid of said other of said thyratrons with a bias for holding said other thyratron in a below cut-off condition regardless of a magneto voltage at the plate thereof, and means connected to the grid and cathode of said one of said thyratrons for supplying the grid thereof with a voltage bias for maintaining said one thyratron in a below cut-off condition regardless of a magneto voltage at the cathode thereof.

16. Electronic switching apparatus as set forth in claim 15, further including a monostable oscillator having an output terminal connected to the input of said coupling capacitor, said oscillator comprising means for providing a series of recurrent pulses for synchronously driving said one and said other thyratrons above cut-off at a repetition rate corresponding to a series of triggers supplied thereto, the width of said recurrent pulses being a function of a grid bias for said oscillator.

References Cited in the file of this patent

UNITED STATES PATENTS

| | | |
|---|---|---|
| 1,977,230 | Eaton | Oct. 16, 1934 |
| 2,445,245 | Sexton | July 13, 1948 |